(No Model.)
E. C. DAVIS.
ELASTIC HORSESHOE.
No. 584,855. Patented June 22, 1897.
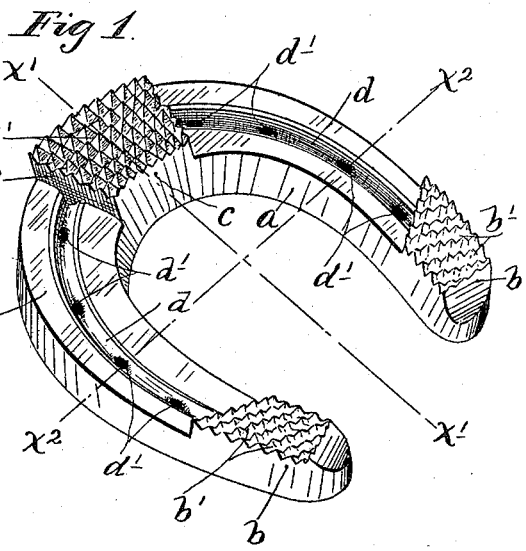
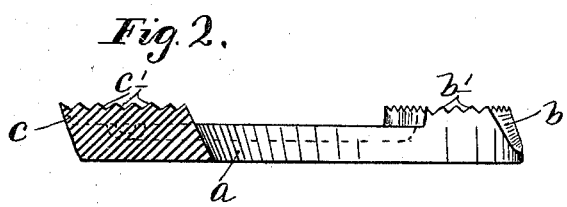
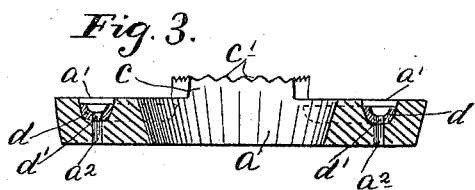
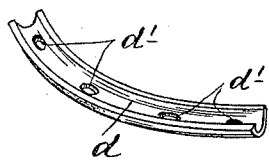
Witnesses.
C. F. Kilgore
R. D. Merchant
Inventor
Ellery C. Davis
By his Attorney.
Jas. F. Williamson
THE NORRIS PETERS CO., PHOTO-LITHO., WASHINGTON, D. C.

UNITED STATES PATENT OFFICE.

ELLERY C. DAVIS, OF CROOKSTON, MINNESOTA, ASSIGNOR OF ONE-THIRD TO GEORGE VINE, IVOR A. KROHNE, THOMAS G. THOMPSON, AND HALVOR STEENERSON, OF SAME PLACE.

ELASTIC HORSESHOE.

SPECIFICATION forming part of Letters Patent No. 584,855, dated June 22, 1897.

Application filed September 19, 1896. Serial No. 606,317. (No model.)

*To all whom it may concern:*

Be it known that I, ELLERY C. DAVIS, a citizen of the United States, residing at Crookston, in the county of Polk and State of Minnesota, have invented certain new and useful Improvements in Elastic Horseshoes; and I do hereby declare the following to be a full, clear, and exact description of the invention, such as will enable others skilled in the art to which it appertains to make and use the same.

My invention has for its object to provide an improvement in the nature of an elastic horseshoe.

To this end my invention consists in the novel devices and combinations of devices hereinafter described, and defined in the claims.

As is a matter of common knowledge, at the present time the streets of all large and of many small cities are paved either with stone, asphalt, or similar hard materials, which, while they are smooth and very easy to travel over, are, on account of their extreme hardness and non-elasticity, very hard on the horses' feet.

In my invention I provide a shoe which is elastic or cushioned, so that it will take the jars or receive the impact between the horse's foot and the road-bed. This will permit a horse to travel over the hardest roads with the same ease and with the same freedom from jars or pounding action on his feet that he now receives in traveling over the best dirt roads. I also construct the shoe with sufficient lateral elasticity to permit the shoe to expand laterally after it has been nailed onto the horse's hoof to compensate for and adapt itself to the growth of the hoof. This latter feature is especially important in shoeing young and growing horses or colts.

The preferred form of my invention is illustrated in the accompanying drawings, like letters referring to like parts throughout the several views.

Figure 1 is a view in perspective looking at the bottom face of a horseshoe constructed in accordance with my invention. Fig. 2 is a longitudinal vertical section taken on the line $x'\ x'$ of Fig. 1. Fig. 3 is a transverse vertical section taken on the line $x^2\ x^2$ of Fig. 1; and Fig. 4 is a view in perspective, showing one of the metallic linings or channel-pieces which are placed in the fullerings or nail-creases.

$a$ indicates the body of the horseshoe, which is constructed, preferably, of rubber or of some compound involving sufficient rubber to give the same the desired elasticity. As shown, the shoe is provided with heel-calks $b$ and with a toe-calk $c$, which calks are preferably provided with roughened striking-surfaces $b'$ and $c'$, respectively.

The quarters of the shoe are provided with fullerings or nail-grooves $a'$, which are in this construction considerably larger and deeper than the fullerings of an ordinary shoe. In these fullerings are placed metallic linings, preferably in the form of channel-pieces $d$, bent to the form of the fullering $a'$, into which the lining is to be placed. These channel-pieces $d$ are provided with nail-holes $d'$. The fullerings $a'$ are of such depth that when the metallic linings $d$ are placed in working position therein they will be countersunk into the body of the shoe $a$, as shown best in Fig. 3. This prevents the metallic channel-pieces $d$ from striking the road-bed when the shoe is stepped upon. The function of these metallic pieces $d$ is twofold. First, they serve to prevent the heads of the nails from being drawn into or through the shoe and act as draw-plates to clamp the flexible shoe against the horse's hoof under the drawing action of the nails, and, second, they serve to stiffen the shoe, while at the same time permitting the quarters of the same to spring laterally to and from each other. This latter feature, as already pointed out, permits the shoe to adapt itself to the growing hoof of the horse to which it is applied, and it also permits the ready and easy adjustment of the shoe to the particular horse's foot to which it is to be applied in case the shoe should be found a little too wide or too narrow in its normal form. This lateral adjustment of the quarters of the shoe is made easy by constructing the linings $d$ in two independent pieces, as shown in the drawings. However, I do not intend to limit myself to these separate and independent pieces. On the contrary, it should be understood that various alterations in the details of construction above set forth may be made without departing from the spirit of my invention. For instance, in the ordinary calkless shoe, in which the calks are dispensed with, a single continuous metallic lining might be placed in a continuous fullering or nail-crease, in which case the metallic lining should be made sufficiently yielding or with sufficient spring to permit the desired lateral flexibility of the shoe. With a calkless shoe the under or striking face of the shoe would preferably be roughened after the manner shown in connection with the calk in the construction illustrated.

In connection with Fig. 3 of the drawings it will be noted that the shoe $a$ is shown as provided with perforations or nail-passages $a^2$, but in practice the said shoe, being made of rubber or flexible material, will be perforated only by the passage of the nail therethrough in the act of shoeing.

These shoes may be manufactured and supplied to the trade in a series of different sizes, and for each size of shoe corresponding and properly-formed linings may be furnished. The rubber calks of calked shoes when worn away may be replaced by new calks, which may be supplied separately to the trade and which may be cemented to the shoe while on the horse's foot by a suitable cement.

What I claim, and desire to secure by Letters Patent of the United States, is as follows:

1. A horseshoe having its body constructed of rubber or similar elastic material having a nail-fullering, and provided with a metallic piece formed with nail-holes, and constituting a lining for the fullering or nail-hole crease, substantially as described.

2. A horseshoe having its body constructed of rubber or similar elastic material having a nail fullering, and provided with a countersunk metallic piece formed with nail-holes and constituting a lining for the fullering or nail-hole crease, substantially as described.

3. A horseshoe, the body of which is constructed of rubber or similar elastic material, and is formed with fullerings or nail-hole creases, one in each quarter, and is provided with a pair of metallic channel-pieces formed with nail-holes and constituting independent linings, one for each of said fullerings, substantially as described.

4. In a horseshoe, the combination with the elastic body portion $a$, provided with the calks $b$ and $c$ and the fullerings $a'$, of the metallic channel-pieces $d$ formed with nail-holes $d'$ and constituting linings for said fullerings $a'$, substantially as described.

In testimony whereof I affix my signature in presence of two witnesses.

ELLERY C. DAVIS.

Witnesses:
JAS. F. WILLIAMSON,
FRANK D. MERCHANT.